(12) United States Patent
Lummitsch et al.

(10) Patent No.: US 8,777,301 B2
(45) Date of Patent: Jul. 15, 2014

(54) INSTRUMENT PANEL ARRANGEMENT

(75) Inventors: Stefan Lummitsch, Ginsheim (DE); Andreas Marutschke, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 20 days.

(21) Appl. No.: 13/463,926

(22) Filed: May 4, 2012

(65) Prior Publication Data

US 2012/0280538 A1 Nov. 8, 2012

(30) Foreign Application Priority Data

May 6, 2011 (DE) .......................... 10 2011 100 687

(51) Int. Cl.
*B60H 1/26* (2006.01)

(52) U.S. Cl.
USPC ......................................................... 296/208

(58) Field of Classification Search
USPC .................................................... 296/208, 70
See application file for complete search history.

(56) References Cited

U.S. PATENT DOCUMENTS

| | | | | |
|---|---|---|---|---|
| 4,909,566 A * | 3/1990 | Hashimoto et al. | ........... | 296/192 |
| 5,938,266 A * | 8/1999 | Dauvergne et al. | ............. | 296/70 |
| 5,997,078 A * | 12/1999 | Beck et al. | ..................... | 296/208 |
| 6,409,590 B1 * | 6/2002 | Suzuki et al. | .................. | 454/143 |
| 6,601,902 B1 * | 8/2003 | Rahmstorf et al. | ............. | 296/70 |
| 7,128,360 B2 * | 10/2006 | Scheib et al. | .................... | 296/70 |
| 7,784,187 B2 * | 8/2010 | Scheib et al. | ................ | 29/897.2 |
| 2007/0102222 A1 | 5/2007 | Tanaka | | |
| 2007/0164586 A1 * | 7/2007 | Erlingfors et al. | ............ | 296/208 |
| 2008/0217963 A1 * | 9/2008 | Brunard | ........................ | 296/208 |
| 2011/0148153 A1 * | 6/2011 | Massoulie et al. | ............ | 296/208 |
| 2013/0088050 A1 * | 4/2013 | Lacroix et al. | ................ | 296/208 |

FOREIGN PATENT DOCUMENTS

| | | |
|---|---|---|
| DE | 19626441 A1 | 1/1998 |
| DE | 102010022007 A1 | 12/2010 |
| JP | 2005119469 A | 5/2005 |
| JP | 2011068202 A | 4/2011 |
| WO | 2010146306 A1 | 12/2010 |

OTHER PUBLICATIONS

German Patent Office, German Search Report, dated Feb. 13, 2012 for German Application No. 102011100687.0.

* cited by examiner

*Primary Examiner* — H Gutman
(74) *Attorney, Agent, or Firm* — Ingrassia Fisher & Lorenz, P.C.

(57) ABSTRACT

An instrument panel arrangement for a motor vehicle is provided. The instrument panel arrangement includes an instrument panel and a ventilation duct housing connected to the instrument panel. A middle region of the ventilation duct housing has, in an impact direction, a flexibility that is at least as great as 0.8 times a flexibility of the instrument panel.

19 Claims, 1 Drawing Sheet

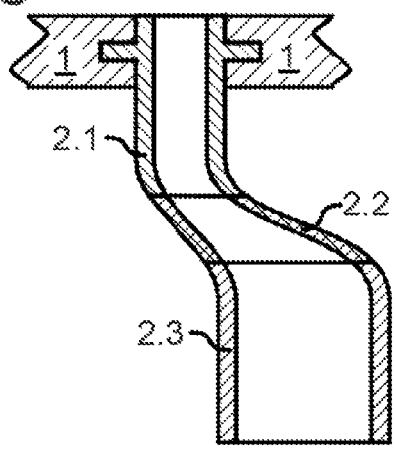
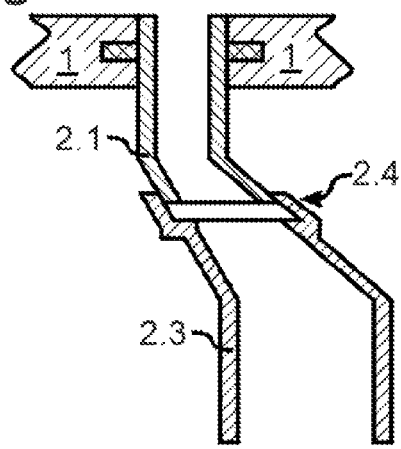
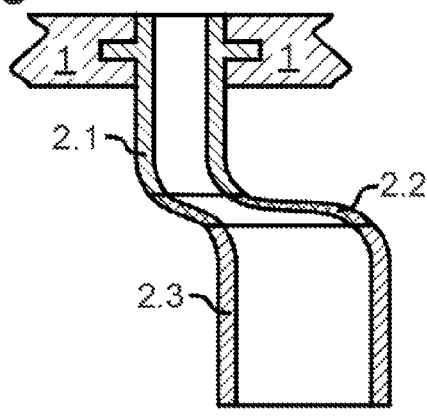
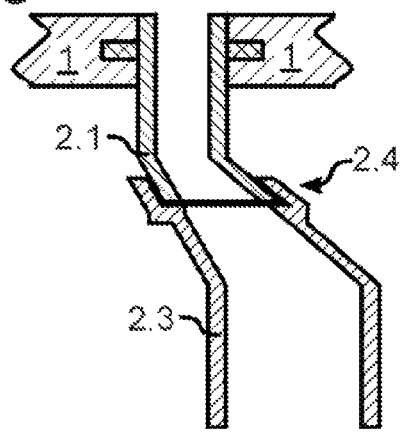

INSTRUMENT PANEL ARRANGEMENT

CROSS-REFERENCE TO RELATED APPLICATION

This application claims priority to German Patent Application No. 10 2011 100 687.0 filed May 6, 2011, which is incorporated herein by reference in its entirety.

TECHNICAL FIELD

The technical field generally pertains to an instrument panel arrangement for a motor vehicle, in particular an automobile with an instrument panel and with a ventilation duct housing connected therewith.

BACKGROUND

To protect pedestrians in collisions with motor vehicles, it is known to construct the instrument panel of the motor vehicle so as to be sufficiently flexible so that on an impact with a pedestrian, in particular with his head, impact energy can be absorbed. Flexibility is understood here in a conventional technical manner as a quotient of a force or of an impulse in an impact direction divided by a yielding movement in the impact direction. In the yielding movement, energy can be absorbed in a dissipative manner, for example by elastic and/or plastic deformation of the component and/or by friction.

On the other hand, it is known to provide in instrument panels one or more ventilation openings for defrosting a windshield and/or for the air conditioning of a passenger compartment. The ventilation openings are connected by ventilation ducts with an air conditioning arrangement, in particular with a fan, an air conditioning system, or the like. The ventilation ducts are defined by ventilation duct housings. Conventional housings can be an obstacle to a sufficient deformation of the instrument panel in the case of a collision with pedestrians and can thus impair the desired absorption of impact energy which was explained above.

It is at least one object herein to provide an improved instrument panel arrangement. In addition, other objects, desirable features and characteristics will become apparent from the subsequent summary and detailed description, and the appended claims, taken in conjunction with the accompanying drawings and this background.

SUMMARY

Ventilation duct housings are provided to be sufficiently flexible so that they impair less an impact energy-absorbing deformation of the instrument panel and preferably even absorb a portion of the impact energy. For this, an instrument panel arrangement for a motor vehicle, in particular for an automobile, has a single-part or multi-part instrument panel. In one example, the single-part or multi-part instrument panel is made of a plastic, such as thermoplastic. One or more ventilation duct housings are fastened detachably on the panel, for example by screw- and/or plug-in connections, or non-detachably, such as by adhesive, welded and/or rivet connections. At least one, advantageously several and preferably all of these ventilation duct housings have in an impact direction, which for example with an instrument panel arrangement incorporated into the motor vehicle can form an angle of between 20° and 70° with the vertical, a flexibility which is at least 0.8 times, in particular 1.0 times and preferably 1.2 times that of the instrument panel. As explained above, a "flexibility" is understood to mean a quotient of a force or of an impulse in the impact direction divided by an in particular maximum, minimum, mean or integral yielding movement in the impact direction. If, for example, an instrument panel in the marginal region of the ventilation opening of the ventilation duct housing yields to a test body with a mass of 4.5 kg and a speed of 35 or 40 km/h under elastic and/or plastic deformation by, purely by way of example, 10 mm, and the air duct housing with the same load, but in the state not connected with the instrument panel by 12 mm, then the ventilation duct housing has 1.2 times flexibility. If the instrument panel, in particular owing to varying wall thicknesses, structures and suchlike, has locally different flexibilities, preferably the flexibility in the marginal region of the ventilation opening of the ventilation duct housing forms the basis as a reference, wherein the ventilation duct housing for measuring this flexibility of the instrument panel is not connected with the ventilation duct housing. In this way, the ventilation duct housing which in this respect is "softer" or respectively more flexible, impairs the energy-absorbing deformation of the instrument panel less and can preferably even absorb a portion of the impact energy in the case of a collision with a pedestrian.

The flexibility of an air duct housing can be realized purely elastically. Thus, in an embodiment, the ventilation duct housing on an impact of a test body with a mass of 4 kg and a speed of 30 km/h can yield purely elastically and can at least substantially deform back again after discontinuance of the test body. In particular, in order to provide an elastic flexibility, in a preferred embodiment the ventilation duct housing can be produced completely or at least partially from an elastic material, in particular an elastomer, preferably of synthetic and/or natural rubber, in particular of ethylene propylene diene rubber (EPDM). In a further embodiment, the ventilation duct housing has one or more sections of an elastic material, in particular an elastomer, preferably of synthetic and/or natural rubber, in particular of EPDM, which are connected on one or both sides with other sections of a different, less flexible material, in particular of a thermoplastic plastic and thus form a hinge structure with an elastic hinge.

Additionally or alternatively to an elastic deformation, in particular on an impact of a test body with a mass of 4 kg and a speed of 30 km/h, a plastic deformation of the ventilation duct housing can be provided. In particular, in order to provide a full or partial plastic flexibility, in one embodiment the ventilation duct housing can be produced entirely or at least partially from foamed plastic, in particular from a thermoplastic. Equally, the ventilation duct housing can be produced entirely or partially as a blow-molded part. In particular in this case the ventilation duct housing has wholly or partially a wall thickness of a maximum of 2 mm, in particular of a maximum of 1.5 mm and preferably of a maximum of 1 mm. Both through the foamed and also the thin-walled structure, a desired elastic and/or plastic flexibility of a ventilation duct housing of a plastic, in particular of a thermoplastic, can be represented. In a further embodiment, the ventilation duct housing has one or more sections of a foamed plastic and/or with a wall thickness of a maximum of 2 mm, in particular of a maximum of 1.5 mm and preferably of a maximum of 1 mm, which are connected on one or both sides with other sections of a less flexible material or respectively with a greater wall thickness and thus form a hinge structure with an elastic or respectively plastic hinge.

Additionally or alternatively to an elastic and/or plastic flexibility, a kinematic flexibility can also be provided. This is understood to mean here that at least two sections of the ventilation duct housing, in particular on an impact of a test body with a mass of 4 kg and a speed of 30 km/h, move with respect to each other in a thrust hinge, for example a telescopic guide. In one embodiment, the ventilation duct housing has two or more sections that are mounted adjacent to each other so as to be displaceable with respect to each other, preferably in a form- and/or friction-fitting manner.

As set forth above, the desired greater flexibility of the ventilation duct housing can be achieved in particular in that the ventilation duct housing is formed completely from an elastic material, a foamed plastic or with a small wall thickness. In order, on the other hand, to ensure a reliable guidance of air and/or to simplify the mounting, additionally or alternatively one or more hinge structures can be provided. A hinge structure can be formed here by a section of an elastic material, of a foamed material, by a section with a small wall thickness and/or by two sections that are mounted so as to be displaceable with respect to each other. Such a hinge structure can be arranged in a curved section of the ventilation duct housing.

BRIEF DESCRIPTION OF THE DRAWINGS

The various embodiments contemplated herein will hereinafter be described in conjunction with the following drawing figures, wherein like numerals denote like elements, and wherein:

FIG. 1A is a cross-sectional view of part of a non-deformed instrument panel arrangement according to an exemplary embodiment;

FIG. 1B is a cross-sectional view of the instrument panel arrangement of FIG. 1A in a deformed state;

FIG. 2A is a cross-sectional view of part of an instrument panel arrangement according to another embodiment in a representation corresponding to FIG. 1A; and FIG. 2B is a cross-sectional view of the instrument panel arrangement of FIG. 2A in a deformed state.

DETAILED DESCRIPTION

The following detailed description is merely exemplary in nature and is not intended to limit the application and uses of the exemplary embodiments. Furthermore, there is no intention to be bound by any theory presented in the preceding background or the following detailed description FIG. 1A shows, in cross-section, a part of a non-deformed instrument panel arrangement according to an exemplary embodiment with a part of an instrument panel 1 of a thermoplastic plastic. On the instrument panel 1, in a manner that is not illustrated in further detail, a ventilation duct housing is fastened which, in a manner not illustrated in further detail, communicates with a vehicle air-conditioning system. The air duct housing has an upper section 2.1 and a lower section 2.3 of a thermoplastic plastic. Owing to the tubular structure of the ventilation duct housing, the latter would have in a vertical impact direction per se a lower flexibility than the plate-shaped marginal region of the instrument panel 1 and thus would be opposed to the impact energy-absorbing deformation thereof in a collision with a pedestrian.

Therefore, in a curved section between the upper and lower section 2.1, 2.3, a middle region or section 2.2 of EPDM is arranged. The middle region or section 2.2 forms a hinge structure of the ventilation duct housing: on an impact of a pedestrian's head (not illustrated) in the region of the instrument panel 1, the latter yields—diagrammatically vertically downwards in the example embodiment of FIG. 1. In so doing, the middle section 2.2 of EPDM of the ventilation duct housing deforms elastically (FIG. 1B), so that the latter does not oppose an energy-absorbing yielding of the instrument panel 1, but rather, in turn, through the deformability of the middle section 2.2, absorbs a portion of the impact energy.

FIG. 2 shows another embodiment in a representation corresponding to FIG. 1. Elements corresponding to each other are designated by identical reference numbers, so that only the differences from the embodiment according to FIG. 1 are entered into below.

In the embodiment of FIG. 2, the hinge structure between the upper and lower section 2.1, 2.3 is realized kinematically by a friction-fitting telescopic guide 2.4 of the upper section 2.1 in the lower section 2.3. Therefore, in the case of a deformation of the instrument panel 1 as a result of collision with a pedestrian (cf. FIG. 2B), the upper part 2.1 can yield with retraction of the telescopic guide 2.4, and thus does not oppose an energy-absorbing yielding of the instrument panel 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents

What is claimed is:

1. An instrument panel arrangement for a motor vehicle, the instrument panel arrangement comprising:
    an instrument panel; and
    a ventilation duct housing connected to the instrument panel,
        wherein a region of the ventilation duct housing has, in an impact direction, a flexibility that is at least 0.8 times that of the instrument panel.

2. The instrument panel arrangement of claim 1, wherein the region of the ventilation duct housing has, in the impact direction, the flexibility that is at least 1.0 times that of the instrument panel.

3. The instrument panel arrangement of claim 2, wherein the region of the ventilation duct housing has, in the impact direction, the flexibility that is at least 1.2 times that of the instrument panel.

4. The instrument panel arrangement according to claim 1, wherein the ventilation duct housing on an impact of a test body with a mass of 4 kg and a speed of 30 km/h yields purely elastically or at least partially at least one of plastically and kinematically.

5. The instrument panel arrangement according to claim 1, wherein the ventilation duct housing is comprised at least partially of an elastic material.

6. The instrument panel arrangement according to claim 5, wherein the ventilation duct housing is comprised at least partially of an elastomer.

7. The instrument panel arrangement according to claim 6, wherein the ventilation duct housing is comprised at least partially of at least one of synthetic and natural rubber.

8. The instrument panel arrangement according to claim 7, wherein the ventilation duct housing is comprised at least partially of ethylene propylene diene rubber.

9. The instrument panel arrangement according to claim 1, wherein the ventilation duct housing is comprised at least partially of foamed plastic.

10. The instrument panel arrangement according to claim 1, wherein the ventilation duct housing has a uniform or nonuniform wall thickness that is no greater than 2 mm.

11. The instrument panel arrangement according to claim 1, wherein the ventilation duct housing has a uniform or nonuniform wall thickness that is no greater than 1.5 mm.

12. The instrument panel arrangement according to claim 1, wherein the ventilation duct housing has a uniform or nonuniform wall thickness that is no greater than 1 mm.

13. The instrument panel arrangement according to claim 1, wherein at least a portion of the ventilation duct housing is a blow-molded part.

14. The instrument panel arrangement according to claim 1, wherein the ventilation duct housing has a hinge structure.

15. The instrument panel arrangement according to claim 14, wherein the ventilation duct housing has two sections that are mounted so as to be displaceable with respect to each other.

16. The instrument panel arrangement according to claim 14, wherein the ventilation duct housing has a section of a material that differs from a material of one or two adjacent sections, wherein the section has a greater flexibility than the one or the two adjacent sections.

17. The instrument panel arrangement according to claim 14, wherein the ventilation duct housing has a section with a wall thickness that differs from a wall thickness of one or two adjacent sections, wherein the section has a greater flexibility than the one or the two adjacent sections.

18. The instrument panel arrangement according to claim 14, wherein the ventilation duct housing has a curved section in which the hinge structure is arranged.

19. A ventilation duct housing for an instrument panel, the ventilation duct housing comprising:
   an upper section;
   a lower section; and
   a middle section coupling the upper section and the lower section, wherein a middle region of the ventilation duct housing has, in an impact direction, a flexibility that is at least 0.8 times that of the instrument panel.

* * * * *